(12) United States Patent
Sakata et al.

(10) Patent No.: US 8,734,956 B2
(45) Date of Patent: May 27, 2014

(54) POLYBUTYLENE TEREPHTHALATE RESIN COMPOSITION

(75) Inventors: Kouichi Sakata, Fuji (JP); Hiroyuki Amano, Fuji (JP)

(73) Assignee: Wintech Polymer Ltd., Minato-ku, Tokyo (JP)

( * ) Notice: Subject to any disclaimer, the term of this patent is extended or adjusted under 35 U.S.C. 154(b) by 592 days.

(21) Appl. No.: 12/747,052

(22) PCT Filed: Dec. 24, 2008

(86) PCT No.: PCT/JP2008/003907
§ 371 (c)(1),
(2), (4) Date: Jun. 9, 2010

(87) PCT Pub. No.: WO2009/081572
PCT Pub. Date: Jul. 2, 2009

(65) Prior Publication Data
US 2010/0266857 A1 Oct. 21, 2010

(30) Foreign Application Priority Data

Dec. 26, 2007 (JP) ................................. 2007-334704

(51) Int. Cl.
| B32B 15/06 | (2006.01) |
| B32B 15/08 | (2006.01) |
| B32B 15/09 | (2006.01) |
| B32B 25/08 | (2006.01) |
| B32B 25/14 | (2006.01) |
| B32B 25/20 | (2006.01) |
| B32B 27/08 | (2006.01) |
| B32B 27/18 | (2006.01) |
| B32B 27/20 | (2006.01) |
| B32B 27/36 | (2006.01) |
| B29C 45/14 | (2006.01) |
| H01R 13/40 | (2006.01) |
| H01R 13/405 | (2006.01) |

(52) U.S. Cl.
USPC ........... 428/447; 428/446; 428/450; 428/451; 428/457; 428/480; 428/483; 525/88; 525/95; 525/98; 525/437; 525/445; 439/733.1; 439/736; 439/586; 439/588; 439/589; 264/241; 264/259; 264/271.1; 264/272.11; 264/279

(58) Field of Classification Search
None
See application file for complete search history.

(56) References Cited

U.S. PATENT DOCUMENTS

| 3,808,180 | A | * | 4/1974 | Owens ........................... 525/291 |
| 4,080,354 | A | * | 3/1978 | Kramer .......................... 523/522 |
| 4,096,202 | A | * | 6/1978 | Farnham et al. ................. 525/64 |
| 4,280,949 | A | * | 7/1981 | Dieck ............................ 524/445 |
| 4,292,233 | A | * | 9/1981 | Binsack et al. ................. 524/494 |
| 4,342,846 | A | * | 8/1982 | Silberberg ...................... 525/64 |
| 4,629,750 | A | * | 12/1986 | Hepp ............................. 523/201 |
| 4,672,086 | A | * | 6/1987 | Seiler et al. .................... 524/127 |
| 4,684,686 | A | * | 8/1987 | Hepp ............................. 524/281 |
| 5,095,514 | A | * | 3/1992 | Curtis ............................ 385/12 |
| 5,115,022 | A | * | 5/1992 | Bronstert et al. ............ 525/92 F |
| 5,194,481 | A | * | 3/1993 | Takagi et al. .................. 524/410 |
| 5,300,332 | A | * | 4/1994 | Kawaguchi et al. ......... 428/34.1 |
| 5,312,690 | A | * | 5/1994 | Fukuda et al. ................. 428/447 |
| 5,340,875 | A | * | 8/1994 | Yang et al. ...................... 525/64 |
| 5,891,943 | A | * | 4/1999 | Katsumata et al. ........... 524/310 |
| 6,335,414 | B1 | * | 1/2002 | Sakamoto et al. .............. 528/34 |
| 6,576,342 | B1 | * | 6/2003 | Cerf et al. ...................... 428/413 |
| 6,645,638 | B2 | * | 11/2003 | Fujiki et al. .................... 428/447 |
| 6,660,789 | B2 | * | 12/2003 | Uno et al. ...................... 524/269 |
| 6,663,967 | B1 | * | 12/2003 | Ziebell .......................... 428/413 |
| 6,679,113 | B2 | * | 1/2004 | Uramachi .................. 73/204.22 |
| 6,780,518 | B2 | * | 8/2004 | Azechi et al. .................. 428/451 |
| 6,878,452 | B2 | * | 4/2005 | Kameda et al. ............... 428/447 |
| 7,135,509 | B2 | * | 11/2006 | Ishii et al. ..................... 524/101 |
| 7,396,428 | B2 | * | 7/2008 | Matsushima et al. ...... 156/272.8 |
| 7,825,177 | B2 | * | 11/2010 | Hara ............................. 524/261 |
| 7,842,771 | B2 | * | 11/2010 | Fehn .............................. 528/15 |
| 7,923,506 | B2 | * | 4/2011 | Cohoon et al. ................ 524/605 |
| 8,052,830 | B2 | * | 11/2011 | Sakata et al. ............... 156/272.8 |
| 8,142,888 | B2 | * | 3/2012 | Sakata et al. .................. 428/325 |
| 2001/0004650 | A1 | * | 6/2001 | Tsuji et al. ..................... 524/334 |
| 2005/0165176 | A1 | * | 7/2005 | Matsushima et al. ......... 525/437 |
| 2007/0129475 | A1 | * | 6/2007 | Sakata et al. .................. 524/306 |
| 2007/0135587 | A1 | * | 6/2007 | Matsushima et al. ......... 525/437 |
| 2011/0092616 | A1 | * | 4/2011 | Sakata et al. .................. 523/506 |
| 2011/0098388 | A1 | * | 4/2011 | Sakata et al. .................. 524/195 |
| 2012/0028063 | A1 | * | 2/2012 | Sakata ........................... 428/480 |

FOREIGN PATENT DOCUMENTS

| JP | 5-500687 A | 2/1993 |
| JP | 6-032912 A | 2/1994 |
| JP | 9-165503 A | 6/1997 |
| JP | 10-235819 A | 9/1998 |
| JP | 2001-234044 A | 8/2001 |
| JP | 2005-133087 A | 5/2005 |
| JP | 2006-016559 A | 1/2006 |
| JP | 2006-111693 A | 4/2006 |
| JP | 2006-291099 A | 10/2006 |
| JP | 2007-091842 A | 4/2007 |

OTHER PUBLICATIONS

International Search Report for PCT/JP2008/003907, mailed Mar. 31, 2009.

* cited by examiner

Primary Examiner — Vivian Chen
(74) Attorney, Agent, or Firm — Buchanan Ingersoll & Rooney P.C.

(57) ABSTRACT

The present invention provides a polybutylene terephthalate resin composition which satisfies performances such as high durability in an environment of heating and cooling cycles and adhesion properties to an addition-reaction type silicone rubber. Specifically, provided is the polybutylene terephthalate resin composition, exhibiting excellent adhesion properties to the addition-reaction type silicone rubber, including: (A) 100 parts by weight of polybutylene terephthalate resin; (B) 5 to 30 parts by weight of a styrene-based thermoplastic elastomer containing 40% by weight or less of styrene component; and (C) 20 to 100 parts by weight of glass fiber.

10 Claims, No Drawings

POLYBUTYLENE TEREPHTHALATE RESIN COMPOSITION

TECHNICAL FIELD

The present invention relates to a polybutylene terephthalate resin composition having excellent adhesion properties to an addition-reaction type silicone rubber and being useful for automobile parts, electric and electronic parts, and the like, and to an integrated molded product of a polybutylene terephthalate resin with silicone rubber.

BACKGROUND ART

Polybutylene terephthalate resin is used in a wide range of fields as an engineering plastic, such as automobile parts, electric/electronic parts due to the excellent mechanical properties, electric properties, and other physical and chemical properties, along with good workability. In particular, in order to protect the contents from damages caused by moisture, dust, external shock, and the like, polybutylene terephthalate resin is preferably used for the casing containing substrate mounted with electronics parts thereon, and the insert-molded products on which sensor probe, connector terminal, and the like are mounted, and the like.

In these applications, for the purpose of avoiding as much as possible, the influence of moisture, dust, and the like on the substrate and the sensor body, a potting material is often heat cured by being filled in a cover with a substrate stored therein or a cover and a casing are often bonded and sealed with an adhesive. As such potting material and the like, epoxy resin and silicone rubber are often used, and specifically silicone rubber is often used for the parts requiring heat resistance and cold resistance. Recently, various joining methods such as double molding, hot-plate welding, vibration welding, and laser welding have been put into practical use. As for the potting intended for protecting the substrate, silicone rubber is widely used independent of the joining methods.

Furthermore, silicone rubber is also used in a method of simple joining of the circuit parts of capacitor and the like, and specifically an addition-reaction type silicone rubber is often used to shorten the curing time. The term "silicone rubber" referred to herein signifies a liquid silicone rubber used as an adhesive and for potting electric/electronic parts. The silicone rubber is largely divided into two types: addition-reaction type silicone rubber; and condensation-reaction type silicone rubber.

In the application where the above methods are used, there are normally arranged metal terminals such as connector, metallic bus bar constituting electric circuit, varieties of sensor parts, and the like by pressure-working or insert-molding. Specifically in applications for parts mounted on automobile, high durability is required in many cases in an environment of high temperature/high humidity and of heating and cooling cycles. Accordingly, there are commonly used polybutylene terephthalate materials characterized by elastomers and various additives.

Depending on the selection of the material of casing and cover, however, there were cases where that kind of silicone rubber caused poor curing and poor adhesion at the interface, and thus was unable to exert sufficient function as the parts, in some cases.

JP-A 9-165503 proposes a composition containing polybutylene terephthalate, a specified silicon compound, a phenol-based antioxidant and/or a thioether-based antioxidant in order to improve the adhesion strength to an addition-reaction type silicone.

That kind of composition, however, cannot satisfy the heating and cooling cycle resistance of the material required in the automobile industry. Generally it is known that the addition of a specific silicon compound in large amounts deteriorates the physical properties of silicone rubber, and the presence of sulfur-based compound and trivalent phosphorus compound deactivates the platinum compound in the curing catalyst to thereby inhibit the reaction. Therefore, the composition disclosed in JP-A 9-165503 is not practically applicable.

JP-A 2006-111693 describes the improvement of heat shock resistance of an insert-molded product in terms of the composition composed of polybutylene terephthalate along with additives of an isoprene-butadiene-styrene-based copolymer, a polycarbonate and/or a vinyl-based copolymer. The disclosure, however, does not contain the description about the adhesion to silicone rubber. Furthermore, the addition of vinyl-based copolymer and polycarbonate may lower the adhesion to silicone rubber.

JP-A 6-32912 describes that a composition of polybutylene terephthalate to which SEBS is added by a vent-type injection molding machine without applying a melt-kneading process provides good mechanical strength, heat resistance, impact resistance, and chemical resistance. For the adhesion to silicone rubber, however, no description is given therein.

JP-A 10-235819 describes that the epoxy-adhesion improves by blending a polyester with a block polymer composed of a polymer block containing mainly a vinyl aromatic compound and a polymer block containing mainly a non-hydrogenate and/or a hydrogenated conjugate diene compound. The disclosure, however, does not describe about the adhesion to silicone rubber. Furthermore, it was confirmed that a non-hydrogenated conjugate diene compound lowers the adhesion to an addition-reaction type silicone rubber.

DISCLOSURE OF THE INVENTION

The present invention was derived responding to the above technological issues, and an object of the present invention is to provide a polybutylene terephthalate resin composition which achieves a balance between the performance such as high durability in an environment of heating and cooling cycle, and the adhesion to an addition-reaction type silicone rubber.

The inventors of the present invention have conducted detail study to obtain a polybutylene terephthalate resin composition capable of achieving the above object, and have found that a composition containing mainly a polybutylene terephthalate resin along with a styrene-based thermoplastic elastomer and glass fiber provides extremely high adhesion to an addition-reaction type silicone rubber and resistance to heat shock without significant lowering of mechanical properties, thus having perfected the present invention.

That is, the present invention provides a polybutylene terephthalate resin composition, having excellent adhesion properties to an addition-reaction type silicone rubber, containing: (A) 100 parts by weight of polybutylene terephthalate resin; (B) 5 to 30 parts by weight of a styrene-based thermoplastic elastomer containing 40% by weight or less of styrene component; and (C) 20 to 100 parts by weight of glass fiber, and provides a molded product prepared by molding the resin composition, specifically an insert-molded product.

The present invention provides a polybutylene terephthalate resin composition which achieves a balance between the performance such as high durability in an environment of heating and cooling cycle, and the adhesion to an addition-reaction type silicone rubber. The polybutylene terephthalate resin composition of the present invention is effectively used for the molded products of casing, cover, and housing, containing varieties of electric/electronic parts, specifically the electronic parts, and the molded products formed by insert-molding•pressure-working the metal terminals, metallic bus bar, or sensor. Furthermore, the molded product of polybutylene terephthalate resin composition of the present invention is particularly useful as a molded product of casing, cover, and housing containing electronic parts, potted and/or adhered by silicone rubber.

DETAIL DESCRIPTION OF THE INVENTION

The structural components of the resin material according to the present invention will be described below in detail. The (A) polybutylene terephthalate resin as the basic resin of the resin composition of the present invention is a polybutylene terephthalate-based resin obtained by the polycondensation of a dicarboxylic acid component containing at least terephthalic acid or an ester-forming derivative thereof (such as lower alcohol) with a glycol component containing at least a $C_4$ alkylene glycol (1,4-butane diol) or an ester-forming derivative thereof. The polybutylene terephthalate resin is not limited to homo-butylene terephthalate resin, and may be a copolymer containing 60% by mole or more, (specifically about 75 to about 95% by mole), of butylene terephthalate unit.

In the polybutylene terephthalate resin, the dicarboxylic acid component (comonomer component) other than terephthalic acid and an ester-forming derivative thereof includes, for example, aromatic dicarboxylic acid components (like $C_6$-$C_{12}$ aryl dicarboxylic acids such as isophthalic acid, phthalic acid, naphthalenedicarboxylic acid or diphenyl ether dicarboxylic acid), aliphatic dicarboxylic acid components (like $C_4$-$C_{16}$ alkyl dicarboxylic acids such as succinic acid, adipic acid, azelaic acid or sebacic acid or, and $C_5$-$C_{10}$ cycloalkyl dicarboxylic acids such as cyclohexanedicarboxylic acid, and the like), or an ester-forming derivative thereof. These dicarboxylic acid components can be used alone or in combination thereof.

Preferred dicarboxylic acid components (comonomer components) include aromatic dicarboxylic acid components (specifically $C_6$-$C_{10}$ aryl dicarboxylic acids such as isophthalic acid), aliphatic dicarboxylic acid components (specifically $C_6$-$C_{12}$ alkyl dicarboxylic acids such as adipic acid, azelaic acid or sebacic acid).

Examples of a glycol component (comonomer component) other than 1,4-butane diol are: aliphatic diol component (for example, alkylene glycol (such as $C_2$-$C_{10}$ alkylene glycol such as ethylene glycol, propylene glycol, trimethylene glycol, 1,3-butylene glycol, hexamethylene glycol, neopentyl glycol or 1,3-octane diol), polyoxy $C_2$-$C_4$ alkylene glycol (such as diethylene glycol, triethylene glycol or dipropylene glycol), and alicyclic diol such as cyclohexane dimethanol or hydrogenated bisphenol A); aromatic diol component (such as aromatic alcohol such as bisphenol A or 4,4'-dihydroxybiphenyl or $C_2$-$C_4$ alkylene oxide adduct of bisphenol A (such as ethylene oxide 2-mole adduct of bisphenol A or propylene oxide 3-mole adduct of bisphenol A)), or an ester-forming derivative thereof. The glycol component can also be used alone or in combination of two or more thereof.

Preferred glycol component (comonomer component) includes aliphatic diol component, specifically $C_2$-$C_6$ alkylene glycol, polyoxy $C_2$-$C_3$ alkylene glycol such as diethylene glycol or alicyclic diol such as cyclohexanedimethanol.

Any of the polybutylene terephthalate-based polymers generated by the polycondensation of the above compound as the monomer component can be used as the (A) component of the present invention. The combined use of homo-polybutylene terephthalate polymer and polybutylene terephthalate copolymer is also useful.

In the present invention, the (A) polybutylene terephthalate resin preferably has an intrinsic viscosity of 0.65 to 1.0, and preferably contains the terminal carboxyl group of 10 to 40 m-equivalent/kg. If the intrinsic viscosity is lower than the above range, desired mechanical properties cannot be attained. If the intrinsic viscosity exceeds the above range, the flowability of the composition significantly lowers to thereby deteriorate the injection-molding performance. If the content of the terminal carboxylic group is lower than the above range, the reinforcing effect of glass fiber significantly decreases and thus, the desired mechanical properties cannot be obtained. If the content thereof exceeds the above range, the desired heat shock resistance cannot be attained, which is not favorable.

A preferred (B) styrene-based thermoplastic elastomer used in the present invention is preferably a block copolymer composed of a polystyrene block and an elastomer block of polyolefin structure.

Examples of the block copolymer include:
polystyrene-polyisoprene-polystyrene block copolymer (SIS);
polystyrene-poly(ethylene/propylene)-polystyrene block copolymer (SEPS);
polystyrene-poly(ethylene/butylene)-polystyrene block copolymer (SEBS); and
polystyrene-poly(ethylene-ethylene/propylene)-polystyrene block copolymer (SEEPS).

These styrene-based thermoplastic elastomers are block copolymer composed of an aromatic vinyl compound and an olefin-based compound or conjugate diene compound.

Examples of the aromatic vinyl compound constituting the block copolymer include styrene, α-methylstyrene, o-, m-, or p-methylstyrene, 2,3-dimethylstyrene, 2,4-dimethylstyrene, monochlorostyrene, dichlorostyrene, p-bromostyrene, 2,4,5-tribromostyrene, 2,4,6-tribromostyrene, o-, m-, or p-tert-butylstyrene, ethylstyrene, and the like. Only one of the aromatic vinyl compounds can be used, or two or more of them can be used at the same time.

Examples of the olefin-based compound constituting above block copolymer include butadiene, isoprene, 2,3-dimethyl-1,3-butadiene, 1,3-pentadiene, 1,3-hexadiene, and the like. The block portion of the conjugate diene compound may be composed of one of these compounds, or of two or more thereof. The block portion thereof is, however, preferably composed of butadiene, isoprene, or a mixture thereof.

The block portion of the conjugate diene compound may contain aliphatic carbon-carbon double bond at the side chain. For example, when a mixture of butadiene and isoprene, or isoprene is adopted as the conjugate diene compound, the block portion of the conjugate diene compound may contain aliphatic carbon-carbon double bond at the side chain, derived from 1,2-bond and 2,4-bond. In this case, the ratio of 1,2-bond to 2,4-bond in the conjugate diene compound is not specifically limited. The total amount of the 1,2-bond and the 3,4-bond is, however, preferably 30% by mole or more to the total amount of the structural unit constituting the block copolymer, and more preferably 40% by mole or more.

In the block portion of the conjugate diene compound, the aliphatic carbon-carbon double bond derived from the conjugate diene compound is preferably hydrogenated in order to improve the heat resistance.

The block copolymer used in the present invention can be prepared by using an alkyl lithium compound as the initiator, and by successively polymerizing butadiene, isoprene, butadiene-isoprene, aromatic vinyl monomer, and the like in a successive order of attaining the desired copolymers.

An example of the alkyl lithium compound is an alkyl compound having the number of carbon atoms of 1 to 10 in the alkyl residue, and specifically preferred ones are methyl-lithium, ethyl lithium, pentyl lithium, and butyl lithium.

In conducting polymerization, a solvent is preferably used for easy reaction control, and an organic solvent inactive to the polymerization initiator is selected. Specifically there are used $C_6$-$C_{12}$ hydrocarbons such as aliphatic hydrocarbon like hexane, heptane, octane, and decane, an alicyclic hydrocarbon corresponding thereto, and further aromatic hydrocarbon like toluene, benzene, and xylene.

Further, the content of the styrene component in the styrene-based thermoplastic elastomer is preferably 40% by weight or less. If the content thereof exceeds 40% by weight, heat shock resistance becomes insufficient in some cases.

The blending content of the (B) styrene-based thermoplastic elastomer in the present invention is within the range of 5 to 30 parts by weight to 100 parts by weight of the (A) polybutylene terephthalate resin, preferably 10 to 25 parts by weight, and more preferably 15 to 20 parts by weight. If the amount of (B) component is excessively small, cracks appear from the metal terminal and bus bar parts inserted in the integral molded product in some cases. If the amount of (B) component is excessively large, the mechanical properties such as toughness necessary to the molded product is deteriorated, which is unfavorable.

Any of known glass fibers is favorably used for the (C) glass fiber of the present invention. The glass fiber diameter, and shapes such as cylindrical shape, cocoon shape cross section, and oblong cross section, or the glass fiber length and cutting method in manufacturing chopped strand, roving, and the like of the glass fiber are arbitrary. Although the present invention does not limit the kind of the glass, E-glass and a corrosion-resistant glass containing zirconium element in the composition thereof are preferably used in view of quality.

In addition, in the present invention, for the purpose of improving the properties of the interface between the glass fiber and the resin matrix, there are preferably used glass fiber surface-treated by an organic treating agent such as amino-silane compound and epoxy compound. Specifically preferred one is glass fiber containing an organic treating agent by 1% by weight or more indicated by loss on heating. Preferable amino-silane compound and epoxy compound used in the glass fiber are any of known ones, independent of the type of amino-silane compound and epoxy compound used for the surface treatment of the glass fiber according to the present invention.

The amount to be used of the (C) glass fiber is 20 to 100 parts by weight to 100 parts by weight of the (A) polybutylene terephthalate resin. If the content of the (C) glass fiber is less than the above range, the variations in linear expansion accompanied with the heating and cooling cycle become larger, which is unfavorable in terms of heat shock resistance. If the content of the (C) glass fiber exceeds the above range, the allowable strain of the material becomes smaller, which is unfavorable in terms of heat shock resistance. Preferable range of the content of (C) glass fiber is from 20 to 80 parts by weight, and more preferably from 30 to 60 parts by weight.

In order to further impart desired properties depending on the objects, the composition of the present invention may also be blended with, to the extent of not deteriorating the adhesion properties to silicone rubber, which is the original object of the present invention, known substances generally added to thermoplastic resin, thermosetting resin, and the like, including: stabilizer such as antioxidant, heat stabilizer, or UV absorber; antistatic agent; coloring agent such as dye or pigment; lubricator; plasticizer and crystallization promoter; crystal nucleation agent; hydrolysis enhancer (such as epoxy compound and carbodiimide); inorganic filler such as talc or glass flake, and the like.

The silicone rubber as referred to in the present invention is a liquid silicone rubber to be used as an adhesive and for potting electric/electronic parts, and is the one which is cured at room temperature or by heating. Among these, the present invention adopts an addition-reaction type silicone rubber which promotes the curing by an addition reaction with a platinum-based catalyst.

The resin composition used in the present invention can be easily prepared by an apparatus and a method commonly used as the conventional method for preparing resin composition. For example, any of the following methods can be used: (1) a method in which the components are blended together, and the mixture is kneaded and extruded through a single-screw or twin-screw extruder to form pellets, and then the pellets are molded; (2) a method in which pellets having different compositions are prepared, and a specified amount of the pellets is blended to be subjected to molding, then after the molding, a molded product having the desired composition is obtained; (3) a method in which one or more of the respective components are directly supplied to a molding machine, and the like. A method in which a part of the resin components is finely powdered, which is then blended with other components is preferable in performing uniform blending of the components.

EXAMPLES

The present invention is described in more detail by referring to the following Examples, however, it is not limited by the examples.

Examples 1 to 5, and Comparative Examples 1 to 6

As shown in Tables 1 and 2, each component was dry-blended to 100 parts by weight of the (A) polybutylene terephthalate resin at the blending ratios given in Tables 1 and 2, which was melt-kneaded in a 30 mm dia. twin-screw extruder (TEX-30, manufactured by Japan Steel Works, Ltd.) to prepare pellets at a cylinder temperature of 260° C., extrusion rate of 15 kg/hr, and screw rotating speed of 150 rpm. Subsequently, each test piece was prepared from the pellets to determine a variety of physical properties. The result is also given in Tables 1 and 2.

The detail of the components used and the method of determining the physical properties are as follows.
(A) Polybutylene Terephthalate Resin
 (A-1) Intrinsic viscosity of 0.69, manufactured by Win-Tech polymer, Ltd.
 (A-2) Modified polybutylene terephthalate prepared by the reaction between terephthalic acid and 1,4-butane diol, wherein 12.5% by mole of dimethyl isophthalate as the copolymer component is used instead of a part (12.5% by mole) of terephthalic acid; intrinsic viscosity of 0.74.
(B) Elastomer Component
 (B-1) HYBRAR 7311, (polystyrene-polyisoprene-polystyrene block copolymer; 12% by weight of styrene component, manufactured by Kuraray Co., Ltd.)
 (B-2) Septon 2005 (polystyrene-poly(ethylene/propylene)-polystyrene block copolymer; 20% by weight of styrene component, manufactured by Kuraray Co., Ltd.)

(B-3) Septon 4055 (polystyrene-poly(ethylene/propylene)-polystyrene block copolymer; 30% by weight of styrene component, manufactured by Kuraray Co., Ltd.)

(B-4) Septon 8006 (polystyrene-poly(ethylene/butylene)-polystyrene block copolymer; 33% by weight of styrene component, manufactured by Kuraray Co., Ltd.)

(B'-1) Septon 8104 (polystyrene-poly(ethylene/butylene)-polystyrene block copolymer; 60% by weight of styrene component, manufactured by Kuraray Co., Ltd.)

(B'-2) Styrene-based elastomer: Epofriend AT504 (epoxy-modified styrene-butadiene copolymer; 70% by weight of styrene component, manufactured by Daicel Chemical Industries.)

(B'-3) Acrylic-based elastomer: EXL 2311, manufactured by Rohm and Haas Company.

(B'-4) Olefin-based elastomer: Toughmer MP 0610, manufactured by Mitsui Chemicals, Inc.

(B'-5) Olefin-based elastomer: Lotader AX 8900, manufactured by Atfina Chemicals.

(B'-6) Olefin-based elastomer: Bond-Fast BF7M, manufactured by Sumitomo Chemical Industry Co., Ltd.

(C) Glass Fiber (C-1) CS 3J-948S, manufactured by Nitto Boseki Co., Ltd.

(Adhesion Strength)

The center portion of the multipurpose test pieces prepared in accordance with ISO 3167 was cut into two pieces. A NITOFLON adhesive tape (thickness of 0.18 mm) with a 7×7 mm hole was adhered to one of the pieces, and a silicone adhesive was applied in the hole portion. Then, other piece was stacked, followed by fixing them with a clip to join them together under a specified curing condition. After joining, the pieces were allowed to stand in an environment of 23° C. and 50% RH for 24 hours or more. Then, a universal testing machine was used to push one of the test pieces away from the other at a pressing speed of 5 mm/min, and determined the maximum value of pushing strength.

The silicone rubber used was SE 1714 manufactured by Dow Corning Toray Co., Ltd., and the curing condition was 120° C. for 1 hour.

(Melt Viscosity Properties)

The melt viscosity was determined in accordance with ISO 11443, at a cylinder temperature of 260° C.

(Heat Shock Resistance)

Insert-injection molding was carried out by injecting the pellets into a mold for forming test pieces (a mold for inserting an iron core of 18 mm in length, 18 mm in wide, and 30 mm in height into a square column of 22 mm in length, 22 mm in wide, and 51 mm in height) so as to provide 1 mm of minimum wall thickness of a portion of the molded resin part, at a resin temperature of 260° C., a mold temperature of 65° C., an injection time of 25 sec, and a cooling time of 10 sec, and thus the insert-molded product was obtained. With a heating and cooling shock testing machine, the insert-molded product was subjected to a heat-shock resistance test by the cycles of: heating to 140° C. and holding the temperature for one and a half hours; cooling to −40° C. and holding the temperature for one and a half hours; and heating to 140° C. The number of cycles when crack appeared on the molded product was determined to evaluate the heat shock resistance.

TABLE 1

| | Examples | | | | |
|---|---|---|---|---|---|
| | 1 | 2 | 3 | 4 | 5 |
| A-1 (parts by weight) | 100 | 100 | 100 | | 100 |
| A-2 (parts by weight) | | | | 100 | |
| B-1 (parts by weight) | 17 | | | | |
| B-2 (parts by weight) | | 17 | | | |
| B-3 (parts by weight) | | | 17 | 17 | |
| B-4 (parts by weight) | | | | | 17 |
| C-1 (parts by weight) | 50 | 50 | 50 | 50 | 50 |
| Adhesion strength to addition-reaction type silicone rubber (N) | 130 | 130 | 140 | 130 | 130 |
| Heat shock resistance | 400 | 400 | 500 | 400 | 250 |
| Melt viscosity (kPa · sec) | 0.22 | 0.23 | 0.25 | 0.25 | 0.24 |

TABLE 2

| | Comparative Example | | | | | |
|---|---|---|---|---|---|---|
| | 1 | 2 | 3 | 4 | 5 | 6 |
| A-1 (parts by weight) | 100 | 100 | 100 | 100 | 100 | 100 |
| B'-1 (parts by weight) | 17 | | | | | |
| B'-2 (parts by weight) | | 17 | | | | |
| B'-3 (parts by weight) | | | 17 | | | |
| B'-4 (parts by weight) | | | | 17 | | |
| B'-5 (parts by weight) | | | | | 17 | |
| B'-6 (parts by weight) | | | | | | 17 |
| C-1 (parts by weight) | 50 | 50 | 50 | 50 | 50 | 50 |
| Adhesion strength to addition-reaction type silicone rubber (N) | 120 | 120 | 60 | 40 | 40 | 30 |
| Heat shock resistance | 60 | 50 | 190 | 160 | 80 | 50 |
| Melt viscosity (kPa · sec) | 0.22 | 0.40 | 0.25 | 0.29 | 0.29 | 0.29 |

The invention claimed is:

1. An integrated molded product of polybutylene terephthalate resin, said resin exhibiting adhesion properties to an addition-reaction type silicone rubber, with silicone rubber, prepared by injecting and curing an addition-reaction type silicone rubber onto the surface of a molded component obtained by insert molding pressure-working of a metal terminal, a metal bus bar, or a sensor, in a polybutylene terephthalate resin composition comprising:
   (A) 100 parts by weight of polybutylene terephthalate resin;
   (B) 5 to 30 parts by weight of a styrene-based thermoplastic elastomer comprising 30% by weight or less of styrene component, wherein the styrene-based thermoplastic elastomer is a block copolymer composed of a polystyrene block and an elastomer block of polyolefin structure; and
   (C) 20 to 100 parts by weight of glass fiber.

2. The integrated molded product according to claim 1, wherein said styrene-based blocks of (B) are derived from styrene, α-methyl styrene, o-, m- or p-methylstyrene, 2,3-dimethylstyrene, 2,4-dimethylstyrene, monochlorostyrene, dichlorostyrene, p-bromostyrene, 2,4,5-tribromostyrene, 2,4,6-tribromostyrene, o-, m- or p-tert-butylstyrene, ethylstyrene, or mixtures thereof.

3. The integrated molded product according to claim 2, wherein said blocks derived from an olefin-based compound are derived from a conjugate diene selected from the group consisting of butadiene, isoprene, 2,3-dimethyl-1,3-butadiene, 1,3-pentadiene, 1,3-hexadiene, and mixtures thereof.

4. The integrated molded product according to claim 3, wherein said conjugate diene blocks are hydrogenated.

5. The integrated molded product according to claim 4 further comprising an electronic component joined with said molded component by using said addition-reaction type silicone rubber.

6. The integrated molded product according to claim 3, further comprising an electronic component joined with said molded component by using said addition-reaction type silicone rubber.

7. The integrated molded product according to claim 1, further comprising an electronic component joined with said molded component by using said addition-reaction type silicone rubber.

8. The integrated molded product according to claim 1, wherein the block copolymer is selected from: polystyrene-polyisoprene-polystyrene block copolymer (SIS); polystyrene-poly(ethylene/propylene)-polystyrene block copolymer (SEPS); polystyrene-poly(ethylene/butylene)-polystyrene block copolymer (SEBS); or polystyrene-poly(ethylene-ethylene/propylene)-polystyrene block copolymer (SEEPS).

9. The polybutylene terephthalate resin composition according to claim 1, wherein the polyolefin structure contains a conjugate diene unit.

10. The polybutylene terephthalate resin composition according to claim 1, wherein the block copolymer contains 88% by weight or less of a polyolefin structure.

* * * * *